(12) United States Patent
Hsu

(10) Patent No.: US 10,197,401 B1
(45) Date of Patent: Feb. 5, 2019

(54) DYNAMIC INFORMATION DISPLAY FOR BUILDING OCCUPANTS

(71) Applicant: Otis Elevator Company, Farmington, CT (US)

(72) Inventor: Arthur Hsu, South Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/668,977

(22) Filed: Aug. 4, 2017

(51) Int. Cl.
| | |
|---|---|
| H01J 1/60 | (2006.01) |
| H01J 7/42 | (2006.01) |
| H05B 37/04 | (2006.01) |
| G01C 21/20 | (2006.01) |
| G09F 19/22 | (2006.01) |
| H04L 29/08 | (2006.01) |
| G08B 13/196 | (2006.01) |
| B62B 3/14 | (2006.01) |
| G06Q 10/04 | (2012.01) |

(52) U.S. Cl.
CPC ..... *G01C 21/206* (2013.01); *G08B 13/19608* (2013.01); *G08B 13/19656* (2013.01); *G09F 19/22* (2013.01); *H04L 67/303* (2013.01); *B62B 3/1424* (2013.01); *G06Q 10/047* (2013.01)

(58) Field of Classification Search
None
See application file for complete search history.

(56) References Cited

U.S. PATENT DOCUMENTS

| | | | |
|---|---|---|---|
| 5,687,499 | A | 11/1997 | Brnjac |
| 6,924,741 | B2 | 8/2005 | Tamayama et al. |
| 7,243,024 | B2 | 7/2007 | Endicott |
| 7,271,739 | B2 | 9/2007 | Higelin |
| 7,375,634 | B2 | 5/2008 | Sprague |
| 8,792,912 | B2 | 7/2014 | Gits et al. |
| 8,838,479 | B2 | 9/2014 | Koningstein |
| 9,111,296 | B2 | 8/2015 | Gorpynich et al. |
| 2003/0214407 | A1 | 11/2003 | Sweatte |
| 2004/0051644 | A1* | 3/2004 | Tamayama ........ G06F 17/30017 340/686.1 |
| 2013/0103608 | A1 | 4/2013 | Scipioni et al. |
| 2014/0032327 | A1 | 1/2014 | Prakash et al. |
| 2014/0040016 | A1 | 2/2014 | Amla et al. |

(Continued)

FOREIGN PATENT DOCUMENTS

| | | |
|---|---|---|
| DE | 10205080 A1 | 5/2003 |
| DE | 102009031019 A1 | 12/2010 |

(Continued)

OTHER PUBLICATIONS

"LG Digital Signage gets personal with Beacon and BLE"; LG Commercial Display Blog; http://lgamazingdisplay.com/lg-commercial-display/lg-digital-signage-gets-personal-with-beacon-and-ble/; May 6, 2016; 6 pages.

(Continued)

*Primary Examiner* — Anh Tran
(74) *Attorney, Agent, or Firm* — Cantor Colburn LLP

(57) ABSTRACT

A method and system of dynamically displaying information to a user is disclosed. A user's location is sensed. Customized information is displayed to the user at a location that is in proximity to the user. The customized information moves as the as the user changes location.

16 Claims, 5 Drawing Sheets

(56) References Cited

U.S. PATENT DOCUMENTS

2015/0185022 A1 7/2015 Yoo et al.
2016/0363452 A1* 12/2016 Mehlman ............. G01C 21/206
2017/0010099 A1* 1/2017 Simcik ...................... G01S 1/68

FOREIGN PATENT DOCUMENTS

| WO | 2015082717 A1 | 6/2015 | |
| WO | WO 2015082717 A1 * | 6/2015 | ............. G01C 21/20 |
| WO | 2017021853 A1 | 2/2017 | |

OTHER PUBLICATIONS

Callahan, Sean; "How Beacons and Other Tech Go Hand-In-Hand with Digital Signage"; Connector Technology, Digital Signage; http://www.digitalsocialretail.com/how-beacons-and-other-tech-go-hand-in-hand-with-digital-signage/; 2017; 3 pages.

* cited by examiner

DYNAMIC INFORMATION DISPLAY FOR BUILDING OCCUPANTS

BACKGROUND

The present disclosure relates in general to elevator systems. More specifically, this disclosure relates to systems and methods for dynamically displaying information to users.

Elevator systems are widely used throughout the world for transporting users from one point to another. In conventional, two-button group elevator systems, elevator call buttons allow users to request elevator service in the up or down direction. Once in the elevator car, the user selects a destination floor. While the hall call button arrangement may be useful for many situations, larger buildings with more traffic volume may benefit from other techniques to manage passenger traffic more efficiently. One such technique that has been gaining popularity is known as a destination entry system.

In a destination entry system, a passenger may request a desired destination on a destination entry device that is located outside the elevator cars. Based on the desired destination, each person may be assigned to an elevator car with the building's elevator system that most efficiently transports the passenger to their desired destination.

BRIEF DESCRIPTION

According to one embodiment, a system includes one or more position sensors configured to determine a location of a user; one or more display units coupled to the one or more position sensors; and a computer system coupled to the one or more position sensors and the one or more display units. The computer system is configured to: sense a user's location; display customized information to the user in proximity to the user; and move the customized information as the user changes location.

In addition to one or more of the features described above, or as an alternative, further embodiments may include wherein: the one or more position sensors comprise one or more three-dimensional sensors selected from one or more of the following: a time-of flight sensor, an infrared sensor used with an infrared emitter, a radio frequency modulated light source with phase detector, a range gated imager, a direct time-of flight imager, a depth sensor, and a video camera.

In addition to one or more of the features described above, or as an alternative, further embodiments may include wherein the customized information includes an indication as to the direction of the user's destination.

In addition to one or more of the features described above, or as an alternative, further embodiments may include wherein the user's destination is an elevator car and the destination is received from a destination entry system.

In addition to one or more of the features described above, or as an alternative, further embodiments may include wherein the user's position as sensed by the one or more position sensors is used to dispatch the elevator car.

In addition to one or more of the features described above, or as an alternative, further embodiments may include wherein the customized information is chosen from one or more of the following: news, weather, and schedule information.

In addition to one or more of the features described above, or as an alternative, further embodiments may include wherein the customized information includes advertisements.

In addition to one or more of the features described above, or as an alternative, further embodiments may include wherein moving the information comprises moving information from a first display unit to a second display unit.

In addition to one or more of the features described above, or as an alternative, further embodiments may include wherein the customized information includes a unique identifier for the user.

In addition to one or more of the features described above, or as an alternative, further embodiments may include wherein the unique identifier is an icon selected by the user.

According to one embodiment, a method includes sensing a user's location; displaying customized information to the user in proximity to the user; and moving the customized information as the user changes location.

In addition to one or more of the features described above, or as an alternative, further embodiments may include wherein sensing the user's location comprises using one or more three-dimensional sensors selected from one or more of the following: a time-of flight sensor, an infrared sensor used with an infrared emitter, a radio frequency modulated light source with phase detector, a range gated imager, a direct time-of flight imager, a depth sensor, and a video camera In addition to one or more of the features described above, or as an alternative, further embodiments may include wherein the customized information includes an indication as to the direction of the user's destination.

In addition to one or more of the features described above, or as an alternative, further embodiments may include wherein the user's destination is an elevator car and the destination is received from a destination entry system.

In addition to one or more of the features described above, or as an alternative, further embodiments may include wherein the user's position as sensed by the one or more position sensors is used to dispatch the elevator car.

In addition to one or more of the features described above, or as an alternative, further embodiments may include wherein the customized information is chosen from one or more of the following: news, weather, schedule information, and advertisements.

In addition to one or more of the features described above, or as an alternative, further embodiments may include wherein moving the information comprises moving information from a first display unit to a second display unit.

According to one embodiment, a computer program product comprises a computer readable storage medium having program instructions embodied therewith, wherein the computer readable storage medium is not a transitory signal per se, the program instructions executable by a processor to cause the processor to: sense a user's location; display customized information to the user in proximity to the user; and move the customized information as the user changes location.

In addition to one or more of the features described above, or as an alternative, further embodiments may further comprise: sensing the user's location using one or more three-dimensional sensors.

In addition to one or more of the features described above, or as an alternative, further embodiments may include wherein. the computer instructions are further configured to: sense the user's location using one or more three-dimensional sensors selected from one or more of the following:

a time-of flight sensor, an infrared sensor used with an infrared emitter, a radio frequency modulated light source with phase detector, a range gated imager, a direct time-of flight imager, a depth sensor, and a video camera Technical effects of embodiments of the disclosure include a system that dynamically displays information at the location of a user.

These and other advantages and features will become more apparent from the following description taken in conjunction with the drawings.

Additional features are realized through the techniques of the present disclosure. Other embodiments are described in detail herein and are considered a part of the claims. For a better understanding of the disclosure with the features, refer to the description and to the drawings.

BRIEF DESCRIPTION OF THE DRAWINGS

The subject matter which is regarded as the disclosure is particularly pointed out and distinctly claimed in the claims at the conclusion of the specification. The forgoing features are apparent from the following detailed description taken in conjunction with the accompanying drawings in which:

Figure 1:
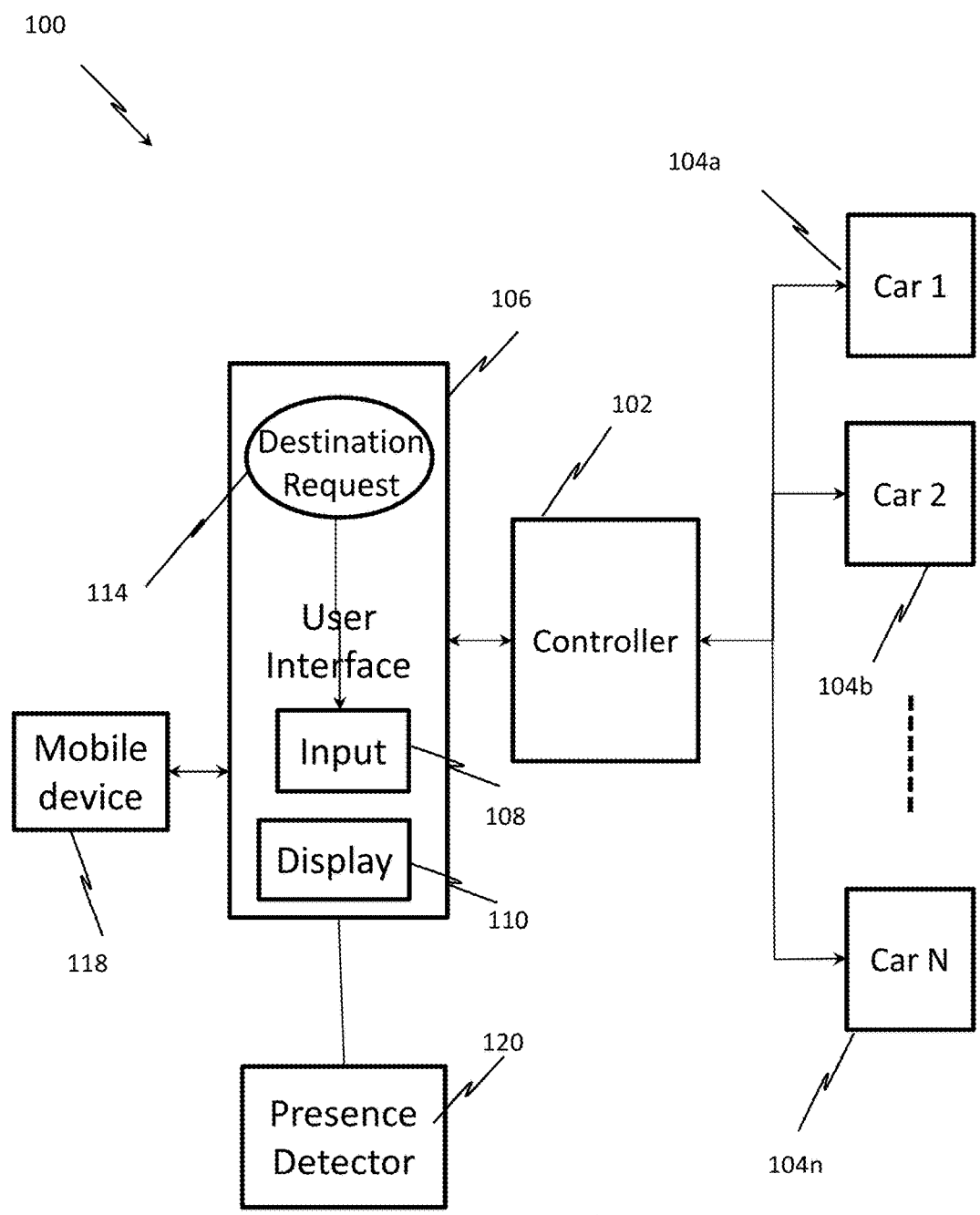
FIG. 1 is a block diagram illustrating an exemplary system of one or more embodiments.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood that this disclosure is no limited to the particular embodiments illustrated herein.

DETAILED DESCRIPTION

Various embodiments will now be described with reference to the related drawings. Alternate embodiments may be devised without departing from the scope of this detailed description. Various connections might be set forth between elements in the following description and in the drawings. These connections, unless specified otherwise, may be direct or indirect, and the present description is not intended to be limiting in this respect. Accordingly, a coupling of entities may refer to either a direct or an indirect connection.

Referring now to the drawings, FIG. 1 illustrates a schematic view of an elevator system 100 with destination management and route selection, also known as destination dispatching, in accordance with an embodiment of the disclosure. In an embodiment, elevator system 100 includes a controller 102 to provide destination dispatch routing with route selection functionality. Controller 102 also controls the operation of cars 104a-n. In one embodiment, one controller may control operation of the cars 104a-n and a second controller may control destination dispatch routing. Controller 102 interacts with users via user interface 106.

User interface 106 allows a user to interface with the elevator system 100. Users may be individual users, such as an employee in a workplace, or a group of users with common preferences, such as employees all working the same shift on the same floor of a building with elevators. In an embodiment, elevator system 100 utilizes destination dispatch routing, which requires destination information before entering a car 104a-104n. In a destination dispatch system, the user selects their desired floor via a user interface 106. In an embodiment, user interface 106 is a physical interface. The user interface 106 may be located in a central kiosk, a sky lobby, an intermediate lobby of a building, or any other suitable location with an elevator system 100. In an alternative embodiment, user interface 106 is a virtual interface to allow users to enter and receive information through other devices, such as portable mobile devices 118, including but not limited to, cell phones, tablets or other alternative devices. In alternative embodiments, user interface 106 is a physical device that allows alternative interfacing via portable devices 118.

In an embodiment, user interface 106 receives information via input 108 for use by controller 102. In an embodiment, input 108 is a physical input, such as a keypad, touch screen, touch pad, mouse, buttons, or any other known user input device, to enter destination requests 114. In certain embodiments, input 108 also allows for the identification of users to allow the retrieval of corresponding user profiles. In certain embodiments, input 108 is a virtual input that allows communication from other suitable devices including mobile devices 118 to allow input of destination requests 114, identification of users and other user inputs. In one embodiment, input 108 may be a scanner or some other device that receives a preset input from a device carried by a user. A presence detector 120 can be present in certain embodiments. Presence detector may take the form of a three-dimensional sensor, as described in further detail below.

In an embodiment, user interface 106 communicates elevator system 100 outputs via display 110. Display 110 may be a physical display that shows elevator system 100 outputs such as identification confirmation, car assignment, system status, car status, and other relevant information. In certain embodiments, display 110 is a virtual display that outputs elevator system 100 outputs to external devices, such as computers, televisions, external displays and mobile devices 118. In an embodiment, display 110 provides elevator system 100 status information, route options, and allows the user to see their car assignment in accordance with the route selection discussed herein.

In an embodiment, a user provides a destination request 114 via input 108. A destination request 114 may include information such as one or all of the source floor, destination floor, opening information, and any other suitable information required by the elevator system 100. In certain embodiments, a user can provide a destination request 114 via a physical keypad or otherwise fixed input methods, touchscreen, etc. as part of input 108. In other embodiments, a user can provide a destination request 114 via a mobile device 118 or other means, such as an RFID security card that contains destination information and is scanned by elevator system 100.

Once the destination request 114 is received, the controller 102 determines which car 104a-104n that particular destination request 114 should be assigned to, and informs the user at the user interface 106. In an embodiment, the elevator system 100 may provide information via a mobile device 118. In an embodiment, the controller 102 may cause the user interface to provide feedback annunciations and information associated with the dispatched elevator car 104a-104n to the user. In one embodiment, the assigned hoistway and/or car are displayed. In another embodiment, the desired destination, or other information may be displayed on display 110, however other forms of informing the user of the assigned floor are possible, including additional displays, annunciators, and audible announcements and information provided to the mobile device 118. When the user makes the destination request 114 at the user interface 106 using input 108 the user may continue to enter a second request or even repeated requests 114 for the same floor.

In general, the controller 102 may receive one or more input signals/corresponding to each elevator car 104a-104n of the elevator system 100 to facilitate elevator system operations. The information includes, but is not limited to, car load, brake status, car door status, car input power, car calling status, service operation mode status, car weight, car position, and car emergency status, and input power status. Based on the information, the controller 102 determines the status of and provides commands to the elevator system 100 and/or the elevator cars 104a-104n included in the elevator system 100. Generally, destination dispatch routing functions in elevator systems 100, need only use a few parameters to determine car assignments for users. Such parameters may include the destination request 114 entered, the current state of cars 104a-104n, and other destination requests 114 entered by other users. As a result, the controller 102 may dispatch and assign cars 104a-104n based on not only the requests of other users, the state of the cars 104a-104n, but also on the previously mentioned "erroneous" multiple requests of the user. This results in inefficient scheduling and routing of the cars.

As stated above, there is often a desire to utilize a display to show each user to the proper destination. There may be six elevator cars lettered A through F in a particular building. In prior systems, when a user is assigned to an elevator car, the assignment is shown to the user on a static display, such as display 110 located near where the user inputted his destination. The user proceeds to the elevator with the appropriate letter. Other systems can be used, such as numbering the elevators or color coding the elevators.

Such static displays can inform the user of their destination. However, it can be desirable to have a dynamic system to guide a user in a more useful manner and to provide additional information.

Turning now to an overview of one or more embodiments, a dynamic display system is used to display more information to a user. The information can be personalized for each user. The dynamic display can be coupled to a tracking system such that the display of data appears to follow the user, which can be useful in larger or more complex building layouts.

Figure 2:
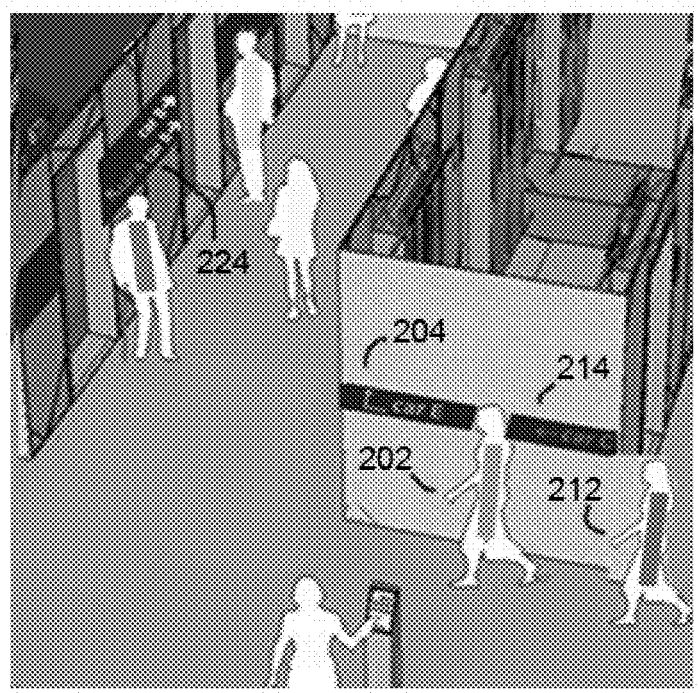
FIG. 2 is a diagram illustrating a dynamic display system of one or more embodiments.

With reference to FIG. 2, an illustration showing an exemplary embodiment is shown. As user 202 walks through the hallway of the exemplary building, a display 204 is present. The contents of the display 204 can be customized. In some embodiments, display 204 is guiding user 202 to his destination (such as a specific elevator car.)

Meanwhile, as user 212 walks through the hallway, he is also shown customized information on display 214. Display 214 can be a separate display from display 204. Display 214 also can be a different portion of the same display as display 204. The information intended for user 202 can be displayed in a unique manner to distinguish the information intended for user 212. For example, information can be color coded such that information for user 202 is displayed in a different color than information for user 212. As another example, user 202 can select an icon to represent himself. User 212 can do the same. Thereafter, information intended for user 202 can be accompanied by his chosen icon. Information intended for user 212 can be accompanied by his chosen icon.

The icons being used can be assigned in many different manners. For example, when a user submits his destination information, he can select the icon. The icon can be a well-known icon, such as one that represents a sports team. The icon can be fanciful, such that the icon merely identifies the user (such as an animal). In some embodiments, icons can be selected from a pool of icons. As each icon is chosen by a user, it is no longer selectable by other users. Therefore, each user has a unique icon that identifies his information. In one embodiment, the icon can be a number, letter, or some other symbol.

In some embodiments, a user can be known. For example, the user may be an employee of a tenant of the building. In such a use case, each user may be pre-assigned an icon, color, or other unique identifier.

In one or more embodiments, each user (such as user 202 and user 212) can be tracked. For example, a three-dimensional sensor or a video sensor (such as a video camera) can be used to determine the position of each user. Exemplary three-dimensional sensors can include time of flight sensors. Such a time of flight sensor can be an infrared sensor that is used in conjunction with an infrared emitter. Other exemplary time of flight sensor technologies can include radio frequency (RF) modulated light sources with phase detectors, range gated imagers, direct time-of-flight imagers, depth sensors (2D and/or 3D), and/or video cameras. In embodiments used in the outdoors, a global navigation system also can be used. Using one or more such sensors, as the user walks through the building, the position of the user is known.

Because the position of the user is known, the information being shown to the user can "follow" the user as he walks through the building. When user 202 is close to display 204, information relevant to user 202 is shown on display 204, at a portion of display 204 that is close to user 202. As user 202 walks toward display 224, the position of user 202 is tracked and the information relevant to user 202 can be shown on display 224, at a position close to the position of user 202.

Display 204 or 224 can be any type of display unit. For example, DLP screens, LED screens, LCD screens, plasma displays, projectors, and the like can be used. The form factor of display 204 or 224 can be that of a traditional computer monitor (such as a 16:9 or 21:9 monitor) or it can be customized, such as a wide but narrow display as shown in FIG. 2. A bank of multiple monitors can be used as display 204 or display 224.

While display 204 and 224 are illustrated as being on a wall, they are not so limited. In some embodiments, displays can be placed on the floor, or a handrail adjacent to the user. Thus, a user who is confused about where to go can merely look down and be reminded of the location of his destination.

In one or more embodiments, the information being shown to a user (such as user 202 or 212) can be customized. While embodiments were described above in relation to a destination entry elevator system, embodiments can be used in any type of system. For example, an airport can use such a system to guide a user to his gate. A shopping mall can use such a system to guide a user to a desired store. A visitor, doctor, or nurse at a hospital can be guided to a specific room.

Figure 5:
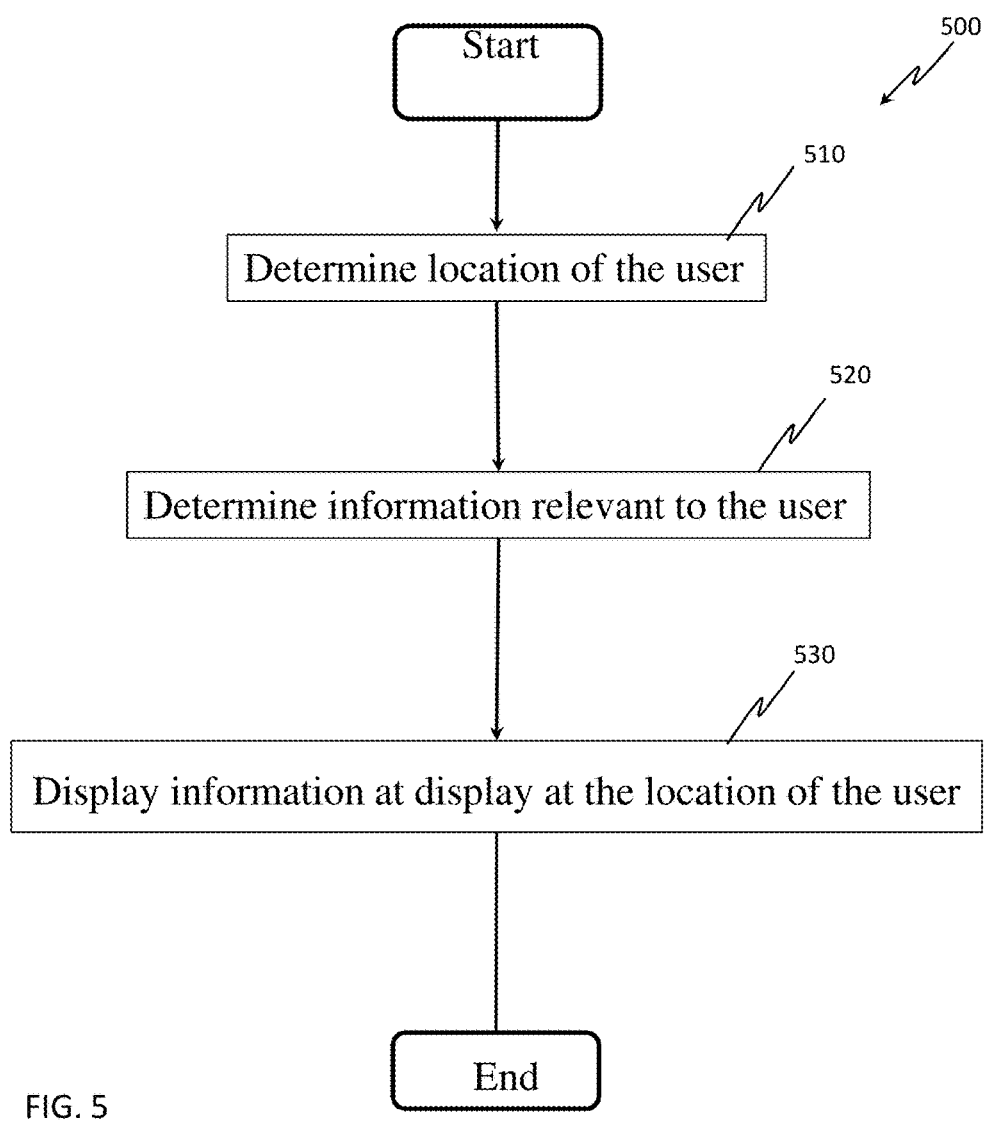
FIG. 5 is a flowchart illustrating the operation of one or more embodiments.

The method described above can be illustrated in flowchart form. FIG. 5 depicts a flowchart illustrating a method 500 according to embodiments of the invention. Method 500 is merely exemplary and is not limited to the embodiments presented herein. Method 500 can be employed in many different embodiments or examples not specifically depicted or described herein. In some embodiments, the procedures, processes, and/or activities of method 500 can be performed in the order presented. In other embodiments, one or more of the procedures, processes, and/or activities of method 500 can be combined, skipped, or performed in a different order.

The location of a user is sensed (block 510). As will be described in further detail below, one or more sensors can be used to perform this sensing. Data relevant to the user is retrieved (block 520). As described above, in one or more embodiments, the information can include directions to the user's destination. The destination can include a specific elevator car. In one or more embodiments, the information being shown to a user can be customized by a profile. For example, if a user is a tenant of a building, the user can select information of interest to the user. For example, the user may indicate an interest in a particular baseball team. Thereafter, as the user walks by a display, information about the baseball team, such as the most recent scores, injury news, trade news, and the like, can be displayed to the user. The type of information need not be limited to sports teams. For example, news relevant to the user's interest can be shown to the user. If the user's commute to his home is known, traffic information relevant to the user can be shown on a display. Weather information can be shown to alert the user of weather conditions (such as a snow storm, hurricane warning, and the like). A user can have the option of linking his calendar to the system. Thereafter, the user can be guided to the location of his next meeting or class, which can be useful for large office buildings, college campuses, and the like.

In one or more embodiments, the user's interests can be used for advertisement purposes. For example, in a shopping mall embodiment, a user who has expressed an interest in a particular brand of shoes can be notified when a store has those shoes on sale. Because the user's location is known, the advertisements can be specific to the location of the user. For example, the user might be informed of a sale at a store when he walks in front of the store. In another example, a restaurant's specials of the day can be placed on the display.

The information is displayed at the sensed location of the user (block 530). As described above, this is a dynamic process, so as the user changes location, the display changes location to be proximate to the user.

There can be a variety of benefits from such a system. While information could be transmitted to a user, such as to a user's smartphone, the use of displays in a building allows the user to focus on his activity (e.g., walking to his destination), instead of being distracted by his smartphone, which could be hazardous and limits personal interaction.

There are also security improvements. There are embodiments where the user can be uniquely tracked. In addition to the position or location of the user, the identity of a regular user (such as a tenant) can be known to a system. This can be in the form of a log-in at security kiosk at a building, a security card (such as a key card or other RFID device), or via a broadcast from the user's smartphone. The user's identity can be used to automatically select a destination for the user, without the need for the user to stop at a security checkpoint.

There are other benefits to a building operator. If a user is known and tracked, the elevator car to the user's destination need not be assigned until the user is in the proximity of the elevator cars (which is being tracked for the display). This improves dispatching, resulting in more efficient usage of elevators during busy time periods.

Figure 3:
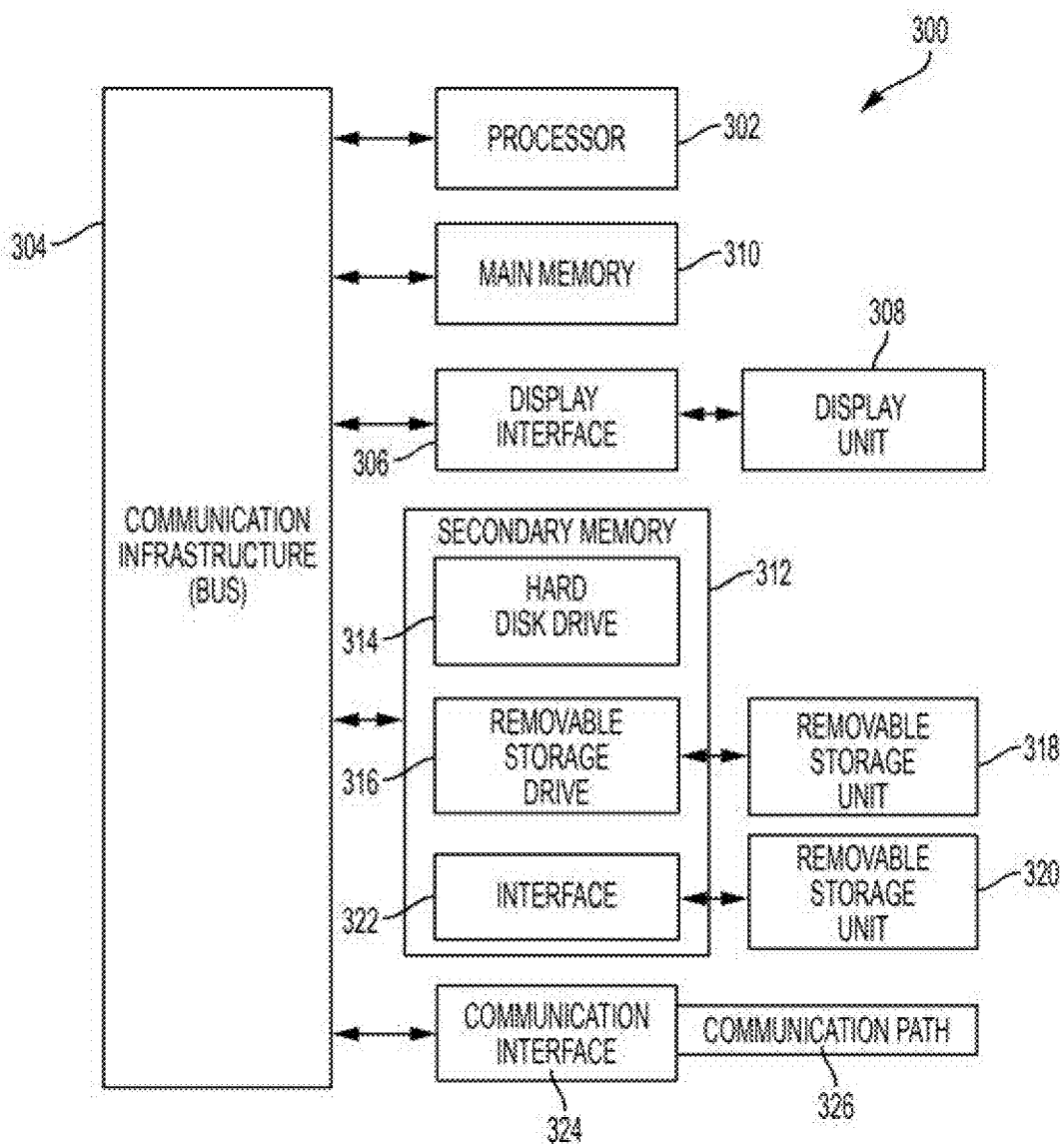
FIG. 3 is a block diagram illustrating an exemplary computer system.

FIG. 3 depicts a high-level block diagram of a computer system 300, which can be used to implement one or more embodiments. More specifically, computer system 300 can be used to implement hardware components of systems capable of performing methods described herein. Although one exemplary computer system 300 is shown, computer system 300 includes a communication path 326, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 326, e.g., to communicate data between them. While numerous components are illustrated in FIG. 3, some embodiments might not include every illustrated component.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, textual content, and other data from communication infrastructure 304 (or from a frame buffer not shown) for display on a display unit 308. Computer system 300 also includes a main memory 310, preferably random access memory (RAM), and can also include a secondary memory 312. Secondary memory 312 can include, for example, a hard disk drive 314 and/or a removable storage drive 316, representing, for example, a floppy disk drive, a magnetic tape drive, or an optical disc drive. Hard disk drive 314 can be in the form of a solid state drive (SSD), a traditional magnetic disk drive, or a hybrid of the two. There also can be more than one hard disk drive 314 contained within secondary memory 312. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disc, etc. which is read by and written to by removable storage drive 316. As will be appreciated, removable storage unit 318 includes a computer-readable medium having stored therein computer software and/or data.

In alternative embodiments, secondary memory 312 can include other similar means for allowing computer programs or other instructions to be loaded into the computer system. Such means can include, for example, a removable storage unit 320 and an interface 322. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 320 and interfaces 322 which allow software and data to be transferred from the removable storage unit 320 to computer system 300.

Computer system 300 can also include a communications interface 324. Communications interface 324 allows software and data to be transferred between the computer system and external devices. Examples of communications interface 324 can include a modem, a network interface (such as an Ethernet card), a communications port, or a PC card slot and card, a universal serial bus port (USB), and the like. Software and data transferred via communications interface 324 are in the form of signals that can be, for example, electronic, electromagnetic, optical, or other signals capable of being received by communications interface 324. These signals are provided to communications interface 324 via communication path (i.e., channel) 326. Communication path 326 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 310 and secondary memory 312, removable storage drive 316, and a hard disk installed in hard disk drive 314. Computer programs (also called computer control logic) are stored in main memory 310 and/or secondary memory 312. Computer programs also can be received via communications interface 324. Such computer programs, when run, enable the computer system to perform the features discussed herein. In particular, the computer programs, when run, enable processor 302 to perform the features of the computer system. Accordingly, such computer programs represent controllers of the computer system. Thus it can be seen from the forgoing detailed description that one or more embodiments provide technical benefits and advantages.

Figure 4:
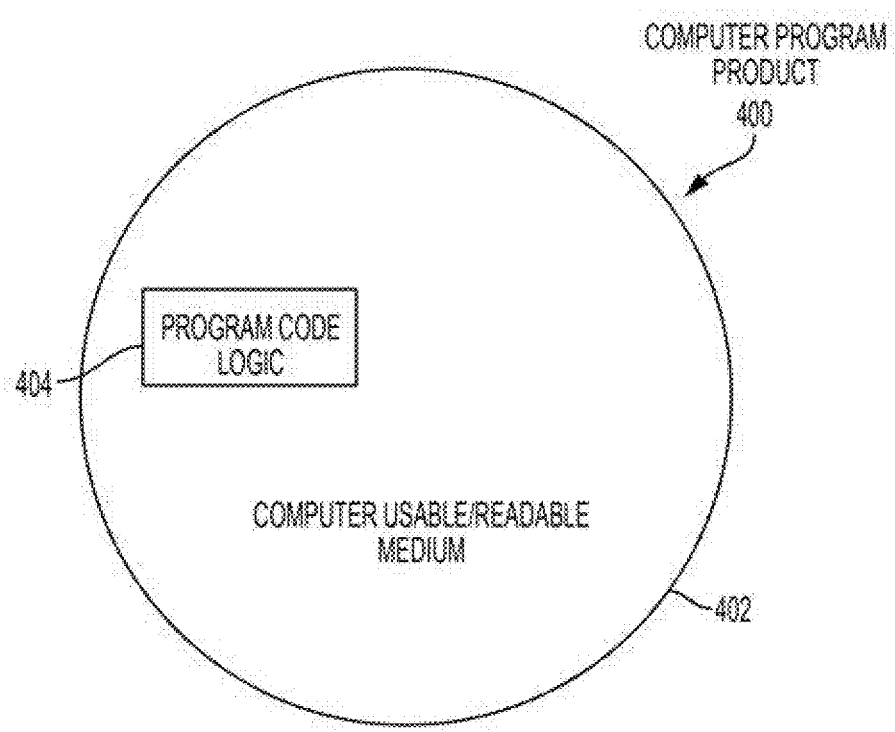
FIG. 4 illustrates a computer program product.

Referring now to FIG. 4, a computer program product 400 in accordance with an embodiment that includes a computer-readable storage medium 402 and program instructions 404 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

From the foregoing, it can be seen that the system and method described herein has industrial applicability in a variety of settings involving the use of customized dynamic displays. Using the teachings of the present disclosure, a customized dynamic display may be constructed to improve the experience of users.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

What is claimed is:

1. A system comprising:
one or more position sensors configured to determine a location of a user;
a plurality of stationary display units coupled to the one or more position sensors; and
a computer system coupled to the one or more position sensors and the plurality of display units; wherein the computer system is configured to:
display customized information to the user in proximity to the user; and
move the customized information across the plurality of display units as the user changes location;
wherein the customized information includes an indication as to the direction of the user's destination, wherein the user's destination is an elevator car and the destination is received from a destination entry system.

2. The system of claim 1 wherein:
the one or more position sensors comprise one or more three-dimensional sensors selected from one or more of the following: a time-of flight sensor, an infrared sensor used with an infrared emitter, a radio frequency modulated light source with phase detector, a range gated imager, a direct time-of flight imager, a depth sensor, and a video camera.

3. The system of claim 1 wherein the user's position as sensed by the one or more position sensors is used to dispatch the elevator car.

4. The system of claim 1 wherein the customized information includes at least one of news, weather, or schedule information.

5. The system of claim 1 wherein the customized information includes advertisements.

6. The system of claim 1 wherein moving the information comprises moving information from a first display unit to a second display unit of the display units.

7. The system of claim 1 wherein the customized information includes a unique identifier for the user.

8. The system of claim 1 wherein the unique identifier is an icon selected by the user.

9. A method comprising:
sensing a user's location;
displaying customized information to the user in proximity to the user on a stationary display unit; and
moving the customized information as the user changes location;
wherein the customized information includes an indication as to the direction of the user's destination, wherein the user's destination is an elevator car and the destination is received from a destination entry system.

10. The method of claim 9 wherein:
sensing the user's location comprises using one or more three-dimensional sensors selected from one or more of the following: a time-of flight sensor, an infrared sensor used with an infrared emitter, a radio frequency modulated light source with phase detector, a range gated imager, a direct time-of flight imager, a depth sensor, and a video camera.

11. The method of claim 9 wherein the user's position as sensed by the one or more position sensors is used to dispatch the elevator car.

12. The method of claim 9 wherein the customized information includes at least one of news, weather, schedule information, or advertisements.

13. The method of claim 9 wherein moving the information comprises moving information from a first display unit to a second display unit.

14. The method of claim 9 wherein the customized information includes a unique identifier for the user.

15. A computer program product, the computer program product comprising a computer readable storage medium having program instructions embodied therewith, wherein the computer readable storage medium is not a transitory signal per se, the program instructions executable by a processor to cause the processor to:
display customized information to a user in proximity to the user on a stationary display unit; and
move the customized information as the user changes location;

wherein the customized information includes an indication as to the direction of the user's destination, wherein the user's destination is an elevator car and the destination is received from a destination entry system.

16. The computer program product of claim 15 wherein the computer instructions are further configured to:
sense the user's location using one or more three-dimensional sensors selected from one or more of the following: a time-of flight sensor, an infrared sensor used with an infrared emitter, a radio frequency modulated light source with phase detector, a range gated imager, a direct time-of flight imager, a depth sensor, and a video camera.

* * * * *